Patented Sept. 18, 1951

2,568,016

UNITED STATES PATENT OFFICE 2,568,016

FORMALDEHYDE CONVERSION

Alexander F. MacLean, Robstown, and Walter E. Heinz, Corpus Christi, Tex., assignors to Celanese Corporation of America, a corporation of Delaware No Drawing. Application March 12, 1949, Serial No. 81,213

9 Claims. (Cl. 260—340)

This invention relates to the treatment of aqueous solutions of formaldehyde and relates more particularly, to the concentration of aqueous formaldehyde whereby paraformaldehyde may be obtained. In the art, the term "paraformaldehyde" includes solid compositions of water and formaldehyde containing 80% or more formaldehyde.

An object of this invention is the provision of an improved process for the production of paraformaldehyde by concentrating aqueous solutions of formaldehyde under controlled conditions of pH whereby excessive polymerization and solidification of the paraformaldehyde formed is avoided during the concentration step.

Another object of this invention is the production of paraformaldehyde of a controlled degree of polymerization which depolymerizes rapidly when added to water and which readily dissolves therein to yield aqueous formaldehyde solutions suitable for various commercial applications.

Other objects of this invention will appear from the following detailed description.

Aqueous formaldehyde may be concentrated by evaporation under vacuum. During the concentration, however, the formaldehyde undergoes polymerization to form polyoxymethyleneglycols, the latter being a mixture of formaldehyde polymers associated with a definite amount of water. The average degree of polymerization of the paraformaldehyde obtained will vary depending upon the conditions under which the concentration and resulting polymerization is effected. As the concentration of the formaldehyde in the aqueous solution increases, the degree of polymerization, i. e. the average molecular weight of the formaldehyde polymer present, also increases and the higher, less-soluble polymers thus formed tend to precipitate paraformaldehyde from solution. The higher polymers may be retained in solution by suitably increasing the solution temperature which increases their solubility but such increase in temperature also increases the polymerization reaction rate. In any commercial process for the concentration of formaldehyde, it is essential not only that the degree of polymerization but the rate of polymerization of the formaldehyde as well be controlled since, without control, the rapid formation of paraformaldehyde of a high average degree of polymerization will yield a solid mass in the vessel in which the formaldehyde concentration is effected. Conversely, too low a degree of polymerization yields a soft product which is both difficult to handle and is of a relatively low formaldehyde content.

We have now found that aqueous solutions of formaldehyde may be concentrated to yield formaldehyde polymers at a controlled rate and of the desired degree of polymerization if said aqueous formaldehyde solutions are concentrated by means of vacuum evaporation while maintaining the pH of the aqueous formaldehyde solution undergoing concentration within the range of 2.9 to 3.5. We have found that under these reaction conditions, the rate at which polymerization takes place is retarded and is relatively slow. Since the polymerization rate is relatively slow, the residence time of the solution in the evaporator in which it is undergoing concentration, i. e. the average length of time it is present therein, may be extended considerably. However, a residence time of one hour when dealing with formaldehyde solutions having a formaldehyde concentration of over 70% is a critical maximum if solidification is to be avoided. Below 70% formaldehyde concentration, residence time is not so critical but the residence time should preferably be below three hours when the concentration is from about 60 to 70% formaldehyde by weight. Since, in accordance with our novel process, the average degree of polymerization effected may be so controlled that the proportion of high molecular weight insoluble polymers is at a minimum, the danger of solid deposition during evaporation and concentration is completely avoided.

Within the pH range of 1.0 to 2.9 and 3.5 to 5.0, which ranges are, of course, outside of our preferred range, the rate of polymerization is exceedingly rapid and residence times of from 2 seconds up to a maximum of, say, 15 minutes are essential if solidification is to be avoided. Such short residence times are commercially impractical. Accordingly, our novel process enables paraformaldehyde to be prepared in a commercially feasible manner since ordinary evaporating equipment may be employed whereas outside of our preferred pH range the very close and careful control of residence time requires highly specialized equipment.

Preferably, our improved vacuum evaporation process is effected in a plurality of stages and the use of two evaporators in series is quite satisfactory. The initial evaporation is preferably effected at a temperature of 45 to 70° C. under a pressure of 20 to 100 mm. of mercury absolute, with the evaporation of the aqueous solution being carried to the point where said solution has a formaldehyde concentration of 60 to 80% by weight.

The second stage of evaporation is preferably effected at a temperature of 70 to 100° C. under a pressure 100 to 200 mm. of mercury absolute and the concentration continued until the aqueous solution contains 80 to 90% by weight of formaldehyde and so rapidly that the period of residence of the solution in the last reboiler is less than one hour. When the concentrated formaldehyde solution thus obtained is discharged and cooled, the formaldehyde polymers in solution solidify the whole mass. Cooling and solidification may be effected by a spraying process or the hot solution may be cooled employing a drum dryer so that the formaldehyde polymer solidifies on the surface thereof to yield paraformaldehyde. The paraformaldehyde may thus be obtained in powder form or in the form of chips when scraped from the drum dryer, which chips may then be ground to a powder form. If desired, the water content may be reduced further by drying. The paraformaldehyde we obtain contains from about 80 to 90% by weight of formaldehyde before drying. After drying, it may contain as high as 95% formaldehyde.

The pH of aqueous formaldehyde solutions may be adequately adjusted to the desired value during evaporation by the addition of a suitable amount of formic acid. In general, formaldehyde solutions contain sufficient formic acid to make the addition of more unnecessary.

In order further to illustrate our invention but without being limited thereto the following example is given:

*Example*

An aqueous solution containing 37% by weight of formaldehyde and containing 0.024% formic acid and having a pH of 3.2 is continuously fed to the first stage of a two-stage vacuum evaporator at a rate of 500 parts by weight per minute. The 37% aqueous formaldehyde solution is concentrated in the evaporator by being maintained therein at a temperature of 61° C. and under pressure of 50 mm. of mercury absolute. Water vapor is continuously evaporated therefrom and, after being condensed, is obtained as a 12% by weight aqueous solution of formaldehyde. The condensate is withdrawn from the condenser of the first-stage vacuum evaporator at a rate of 250 parts by weight per minute. The formaldehyde solution is concentrated in the first stage to an aqueous solution containing 70% by weight of formaldehyde the residence time therein being less than three hours. The temperature is sufficiently high to maintain the paraformaldehyde present in solution. The vapor and liquid are separated by continuously circulating the solution being concentrated through a suitable separator and back into the evaporator. A side stream of the circulating concentrated formaldehyde solution leaving the separator is fed to a second vacuum evaporator where it is further evaporated by being maintained at a temperature of 90° C. under a pressure of 125 mm. of mercury absolute. The rate of evaporation is such that a residence time of less than one hour is maintained in said second evaporator. The vapor and liquid are passed through a second separator and the vapors separated therein are then passed to a condenser where the vapors are condensed as a 40% by weight aqueous solution of formaldehyde. The condensate, in an amount of 85 parts by weight per minute, is recycled back to the feed inlet of the first vacuum evaporator while the liquid leaving the separator is returned to the second vacuum evaporator. A side-stream consisting of 165 parts per minute of 85% by weight aqueous formaldehyde is withdrawn from the liquid stream circulating from the separator back to the second vacuum evaporator. The concentrated side-stream solution is fed to a drum cooler on which the paraformaldehyde in solution solidifies. The paraformaldehyde is scraped from the rotating drum cooler in the form of chips, fed to a rotary dryer where further water is removed and the dried powder is then ground to the desired particle size. The powder obtained comprises paraformaldehyde of a formaldehyde content of over 91%. Intermediate precipitation of the formaldehyde in the evaporators is completely eliminated.

It is to be understood that the foregoing detailed description is given merely by way of illustration and that many variations may be made therein without departing from the spirit of our invention.

Having described our invention, what we desire to secure by Letters Patent is:

1. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute and the second stage being effected at a temperature of 70 to 100° C. under a pressure of 100 to 200 mm. of mercury absolute, the maximum evaporator residence time during evaporation being three hours when the formaldehyde solution undergoing concentration contains over 60% by weight of formaldehyde.

2. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute until the concentrated solution has a formaldehyde content of 60 to 80% by weight and the second stage being effected at a temperature of 70 to 90° C. under a pressure of 100 to 200 mm. of mercury absolute until the concentrated solution has a higher formaldehyde content of 80 to 90% by weight, the maximum evaporator residence time during evaporation being three hours when the formaldehyde solution undergoing concentration contains over 60% by weight of formaldehyde.

3. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute until the concentrated solution has a formaldehyde content of 60 to 80% by weight and the second stage being effected at a temperature of 70 to 90° C. under a pressure of 100 to 200 mm. of mercury absolute until the concentrated solution has a formaldehyde content of 80 to 90% by weight, the maximum evaporator residence time during evaporation being about one hour when the formaldehyde solution undergoing concentration contains over 70% by weight of formaldehyde.

4. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute until the concentrated solution has a formaldehyde content of 60 to 80% by weight and the second stage being effected at a temperature of 70 to 100° C. under a pressure of 100 to 200 mm. of mercury absolute until the concentrated solution has a formaldehyde content of 80 to 90% by weight, the maximum evaporator residence time during evaporation being about one hour when the formaldehyde solution undergoing concentration contains over 70% by weight of formaldehyde and then cooling the concentrated formaldehyde solution to obtain paraformaldehyde therefrom.

5. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute until the concentrated solution has a formaldehyde content of 60 to 80% by weight and the second stage being effected at a temperature of 70 to 100° C. under a pressure of 100 to 200 mm. of mercury absolute until the concentrated solution has a higher formaldehyde content of 80 to 90% by weight, cooling the concentrated formaldehyde solution to obtain paraformaldehyde therefrom and then drying the paraformaldehyde, the maximum evaporator residence time during evaporation being three hours when the formaldehyde solution undergoing concentration contains over 60% by weight of formaldehyde.

6. Process for the production of paraformaldehyde, which comprises evaporating and concentrating an aqueous solution of formaldehyde maintained at a pH of 2.9 to 3.5 by heating the same under vacuum in two stages, the first evaporation stage being effected at a temperature of 45 to 70° C. under a pressure of 25 to 100 mm. of mercury absolute until the concentrated solution has a formaldehyde content of 60 to 80% by weight and the second stage being effected at a temperature of 70 to 100° C. under a pressure of 100 to 200 mm. of mercury absolute until the concentrated solution has a formaldehyde content of 80 to 90% by weight, the maximum evaporator residence time during evaporation being about one hour when the formaldehyde solution undergoing concentration contains over 70% by weight of formaldehyde, cooling the concentrated formaldehyde solution to obtain paraformaldehyde therefrom and then drying the paraformaldehyde.

7. Process for the production of paraformaldehyde, which comprises evaporating and concentrating an aqueous solution of formaldehyde maintained at a pH of 2.9 to 3.5 by heating the same under vacuum in two evaporation stages, the first stage being effected at a temperature of about 60° C. under a pressure of about 50 mm. of mercury absolute until the concentrated solution has a formaldehyde content of about 75% by weight and the second stage being effected at a temperature of about 90° C. under a pressure of about 125 mm. of mercury absolute until the concentrated solution has a formaldehyde content of about 85% by weight, the maximum evaporator residence time during evaporation being three hours when the formaldehyde solution undergoing concentration contains over 60% by weight of formaldehyde.

8. Process for the production of paraformaldehyde, which comprises evaporating and concentrating an aqueous solution of formaldehyde maintained at a pH of 2.9 to 3.5 by heating the same under vacuum in two evaporation stages, the first stage being effected at a temperature of about 60° C. under a pressure of about 50 mm. of mercury absolute until the concentrated solution has a formaldehyde content of about 75% by weight and the second stage being effected at a temperature of about 90° C. under a pressure of about 125 mm. of mercury absolute until the concentrated solution has a formaldehyde content of about 85% by weight, and then cooling the concentrated solution to obtain paraformaldehyde therefrom, the maximum evaporator residence time during evaporation being three hours when the formaldehyde solution undergoing concentration contains over 60% by weight of formaldehyde.

9. Process for the production of paraformaldehyde, which comprises evaporating and concentrating an aqueous solution of formaldehyde maintained at a pH of 2.9 to 3.5 by heating the same under vacuum in two evaporation stages, the first stage being effected at a temperature of about 60° C. under a pressure of about 50 mm. of mercury absolute until the concentrated solution has a formaldehyde content of about 75% by weight and the second stage being effected at a temperature of about 90° C. under a pressure of about 125 mm. of mercury absolute until the concentrated solution has a formaldehyde content of about 85% by weight, the maximum evaporator residence time during evaporation being about one hour when the formaldehyde solution undergoing concentration contains over 70% by weight of formaldehyde, and then cooling the concentrated solution to obtain paraformaldehyde therefrom.

ALEXANDER F. MacLEAN.
WALTER E. HEINZ.

REFERENCES CITED

The following references are of record in the file of this patent:

UNITED STATES PATENTS

| Number | Name | Date |
|---|---|---|
| 2,116,783 | Finkenbeiner et al. | May 10, 1938 |
| 2,125,375 | Hinegardner | Aug. 2, 1938 |
| 2,153,526 | Walker | Apr. 4, 1939 |
| 2,498,206 | Greenwald | Feb. 21, 1950 |

Certificate of Correction

Patent No. 2,568,016 September 18, 1951

ALEXANDER F. MacLEAN ET AL.

It is hereby certified that error appears in the printed specification of the above numbered patent requiring correction as follows:

Column 4, line 14, for "formaldehyde" read *paraformaldehyde*; and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*